UNITED STATES PATENT OFFICE.

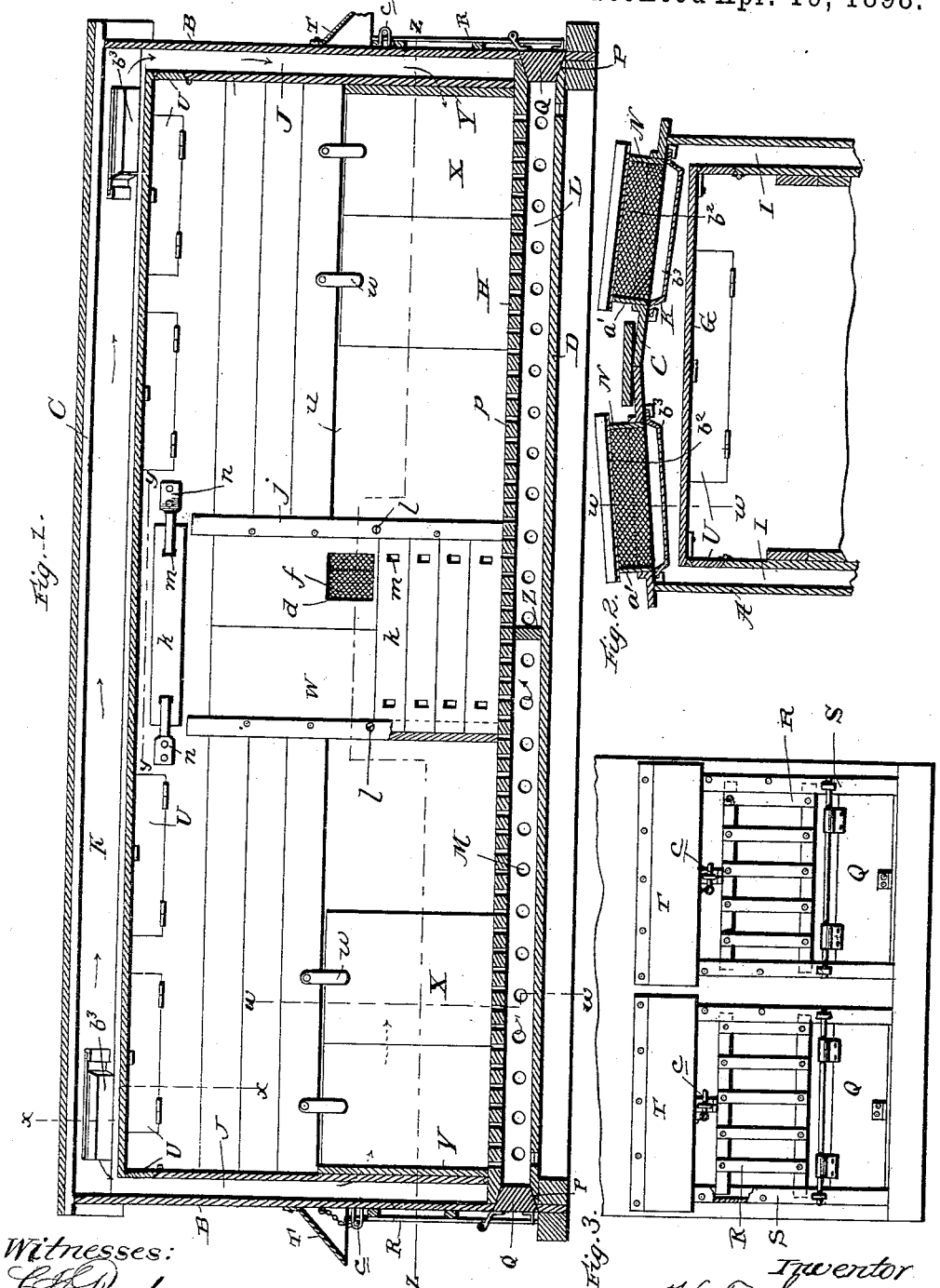

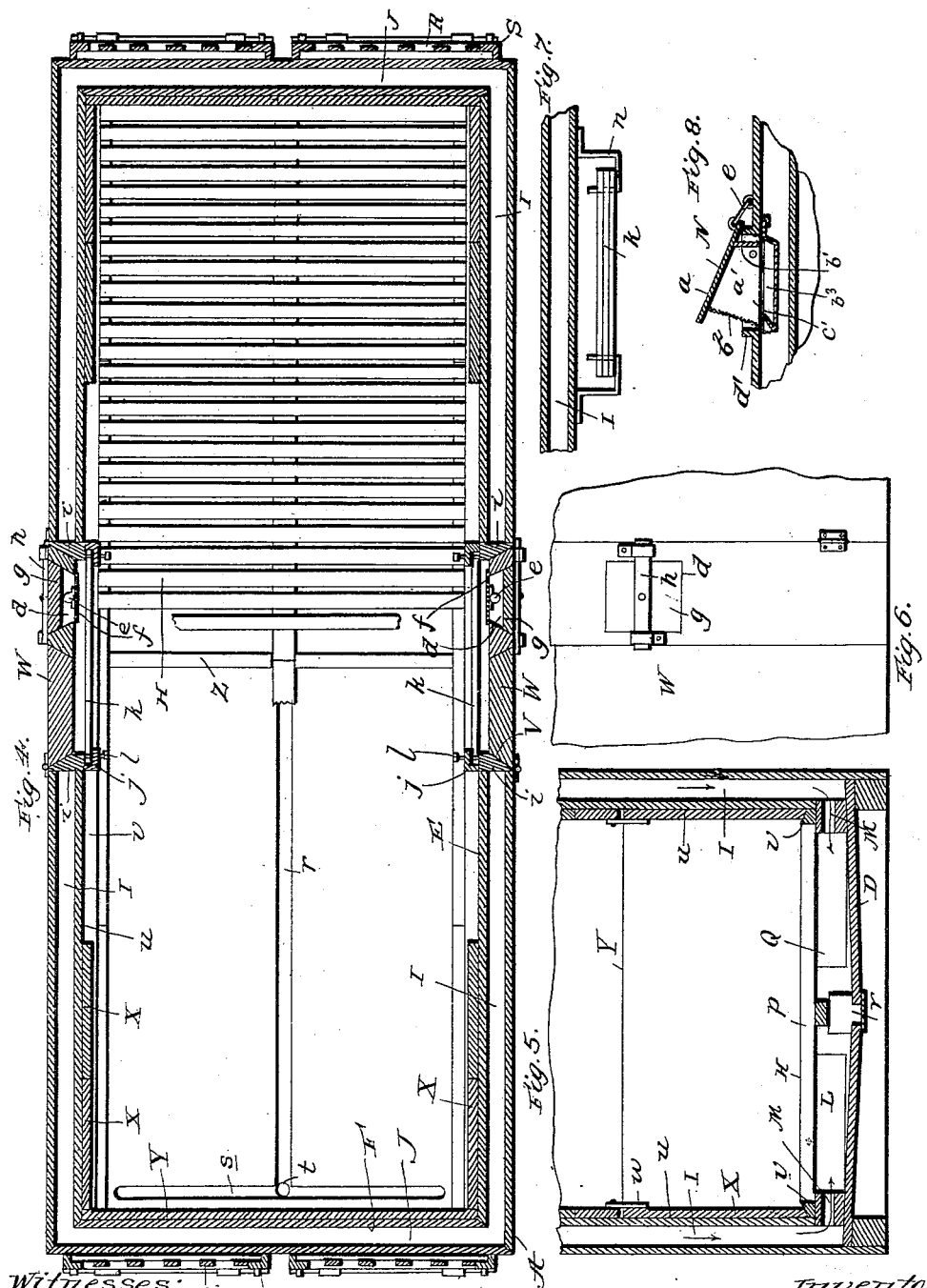

HENRY F. STANLEY, OF NEW ORLEANS, LOUISIANA.

REFRIGERATOR-CAR.

SPECIFICATION forming part of Letters Patent No. 602,483, dated April 19, 1898.

Application filed May 28, 1897. Serial No. 638,583. (No model.)

*To all whom it may concern:*

Be it known that I, HENRY F. STANLEY, a citizen of the United States, residing at New Orleans, in the parish of Orleans and State of Louisiana, have invented certain new and useful Improvements in Refrigerating-Cars; and I do declare the following to be a full, clear, and exact description of the invention, such as will enable others skilled in the art to which it appertains to make and use the same.

My invention relates to improvements in freight-cars and will be fully understood from the following description and claims when taken in conjunction with the annexed drawings, in which—

Figure 1 is a vertical longitudinal central section of my improved combination-car. Fig. 2 is a detail transverse section taken in the plane indicated by the line $x\,x$ of Fig. 1. Fig. 3 is a detail end elevation of a portion of the car. Fig. 4 is a horizontal section taken in the plane indicated by the line $z\,z$ of Fig. 1. Fig. 5 is a detail transverse section taken in the plane indicated by the line $w\,w$ of Fig. 1, looking in the direction indicated by arrow. Fig. 6 is a detail elevation of a portion of one pair of doors. Fig. 7 is a detail section taken in the plane indicated by the line $y\,y$ of Fig. 1, and Fig. 8 is a detail section taken in the plane indicated by the line $w\,w$ of Fig. 2.

In the said drawings similar letters designate corresponding parts in all of the several views, referring to which—

A indicates the outer side walls of the car; B, the outer end walls; C, the outer top wall, which is preferably pitched from its longitudinal center downwardly and outwardly, as illustrated, and D the bottom wall, which is preferably pitched downwardly and inwardly toward its longitudinal center, (see Fig. 5,) while E indicates the inner side walls; F, the inner end walls; G, the inner top wall, and H the inner or false bottom wall, the said outer and inner walls being arranged about the proportional distance illustrated from each other, so as to form the side air-spaces I between the walls A E, the end air-spaces J between the walls B F, the top air-space K between the walls C G, and the bottom air-space L between the walls D H, all as better shown in Figs. 1 and 4 of the drawings. The top air-space K, the end air-spaces J, and the side air-spaces I are in full and free communication with each other, as illustrated, while the side spaces I are connected with the air-space L by openings M, formed in the inner side walls E, as illustrated.

On the top wall C, adjacent to the opposite ends of the car, are arranged ventilators N for the admission of air, the said ventilators each having the inclined top wall $a$, side walls $a'$, a rear transverse wall $b'$, and a piece of flexible gauze $b^2$, connected to the top and to the forward ends of the side walls of the ventilator and adapted when the ventilator is opened to impinge against the edge of the top wall of the car, as shown. The ventilator is loosely arranged in an opening $c'$ in the wall C and is pivotally connected with said wall, so as to permit of its being opened and closed, the top wall $a$ of the ventilator being designed to rest on a boss $d'$, surrounding the opening $c'$, when the ventilator is closed, and said ventilator being designed to be held open by the hook and eye $e'$, as illustrated, or by other suitable means.

The mouths of the ventilators N are arranged contiguous to the ends of the car, so that when the car is traveling in one direction air will enter the space K through one pair of ventilators and when the car is traveling in the opposite direction air will enter space K through the other pair of ventilators. From the space K the air will pass to the end and side air-spaces, and from the latter through openings M into the space L, from whence it will pass up through the floor H, which is formed of slats, as presently described, into the interior of the car, the chamber L being provided at its middle with a transverse partition Z, as shown, to compel the air to pass up through bottom wall H. In this way it will be seen that the interior of the car will be continuously supplied with an ample quantity of fresh air, and at the same time all the air-spaces surrounding such interior will be occupied by fresh air, which will assist materially in keeping the interior of the car cool and dry. It will also be seen that while the forward ventilators of the car are supplying the interior of the same with fresh air the suction created at the mouths of the rear ventilators will exhaust air through the vents U from the interior of the car. Air may also be introduced to the interior of the car, when desired, through the openings P, formed in the end walls coincident with the space L, as shown. These openings P, when it is not desired to introduce air to the interior of the car through them, are closed by the hinged plug-doors Q, and when the doors Q are open said openings P are closed by the slat-doors R, which are arranged in suitable guides S and hold open doors Q. The doors R, when the plug-doors Q are in their closed position, are held in the position shown in Fig. 3 by pins $c$ or other suitable means, and when the doors Q are swung open the doors R may be released by withdrawing the pins $c$, and may be then moved downwardly in the guides S until they rest over the openings P and between the plug-doors and said openings P, so as to permit the free entry of air and yet prevent the entry of rodents.

T indicates awnings which are provided upon the end walls B over the doors R and guides S to protect the same from the weather, and U indicates vent-doors which are arranged in the inner side and end walls E F, adjacent to the inner top wall G. These vent-doors U and the doors Q, together with the ventilators N, are designed to be opened when the car is to remain at one place for any length of time, and in consequence it will be seen that the air entering through the openings P will pass through the space L and slat-wall H into the interior of the car, and from thence through the vent-openings into the side and end spaces and then through the top air-space K and out through the ventilators N. In this way a constant circulation of air through the interior of the car will be maintained while the car is standing still.

In the inner and outer side walls A E are formed door-openings V, which are preferably closed by hinged doors W, as shown. These doors W are arranged in pairs, as illustrated, and one door of each pair is provided with an opening $d$, in which is arranged a thermometer $e$, mounted on a piece of gauze $f$, which is stretched across the opening at the inner side of the door, as shown, and serves the additional function of excluding flies and other insects from the interior of the car. The opening $d$ is closed by a plug or door $g$, which is fastened by a suitable latch $h$ and is designed to be removed when it is desirable to ascertain the temperature of the interior of the car. This provision is highly advantageous, as it enables an attendant to ascertain the temperature of the interior of the car without opening one of the doors W and admitting a quantity of hot air to the interior of the car.

At the inner side of the side stiles $i$ of the door-openings V are arranged guides $j$, as better shown in Figs. 1 and 4 of the drawings. These guides $j$ are designed to receive slats $k$, which are removably placed one above the other therein, and may, if desired, be secured by pins $l$ or other suitable means. The said slats $k$ are designed to prevent freight from falling out through the door-openings V when the doors W are opened, and they have apertures $m$, as shown, whereby they may be placed out of the way on brackets $n$ when not in use, as best shown in Figs. 1 and 7 of the drawings. The slats $k$ are highly advantageous, inasmuch as by the construction described they may be repeatedly used and may be conveniently placed in and removed from the guides when desirable. It will also be readily appreciated that they obviate the necessity of partly closing the openings V by nailing boards to the sills $i$ and thus effect a material saving in lumber and labor and prevent damage to the car.

The car as described is adapted for the transportation of bananas and other perishable fruit and produce which require no ice for their preservation, but need an ample supply of air, and it will be observed that it is simple in construction and is adapted to carry a full load of freight. Said car is adapted to be readily transformed into a refrigerator-car when it is desired to use the same for transporting meat, butter, and similar products during hot weather, it being simply necessary when the car is to be made a refrigerator-car to charge the space L with ice, which may be introduced through the openings P or by raising one or more of the slat-sections $p$ of which the inner bottom wall H is formed. When the space L is charged with ice and the car is used as a refrigerator-car, the openings P are closed by the plug-doors Q, and the ventilators N are also closed.

$b^3$ indicates pans which are arranged below the openings $c'$ in the top wall of the car and are designed to catch and hold any cinders, dust, or the like that may find its way through the gauze $b^2$. These pans are arranged in ledges $b^8$ on the under side of the top wall C, adjacent to the openings $c'$, and they are designed to be removed through the vent-doors U and discharged of their contents and afterward replaced in position.

In virtue of the space L, which serves as an ice-chamber when the car is used for refrigerative purposes, being arranged at the bottom of the car it will be seen that the car may be quickly and easily "iced," and there is no danger of any of the drippings getting upon the freight, as is common in those cars in which the ice-chamber is arranged at the top of the car. The drippings from the ice in my improved chamber L follow the inclined floor D and enter the longitudinal central channel $r$ and end channels $s$ therein, by which they are conducted to the discharge-openings $t$.

X Y indicate floor-sections which are designed for use when the car is to be used like an ordinary freight-car for the transportation of grain and the like in bulk. These sections X Y when not in use rest in recesses $u$ in the inner sides of the inner side and end walls E F, respectively, and upon beveled sills $v$, (see Fig. 5,) and they are secured in such positions by turn-buttons $w$, as shown. When said floor-sections X Y are to be used, the sections X are moved toward the door-openings V sufficiently far to permit of the end sections Y being let down upon the wall H, and said sections X are then let down upon the said wall H. The end sections Y correspond in width to the interior of the car, while the side sections X correspond in width to one-half that of the interior of the car, and consequently it will be seen that when the end sections Y are let down and the side sections X are let down from both side walls an imperforate floor will be afforded and one suitable to support grain or other produce shipped in bulk.

It will be appreciated from the foregoing that my improved car is adapted, with slight changes which may be readily effected, to ship all kinds of freight, perishable or otherwise, no matter whether the same is shipped in bulk or in receptacles.

It will also be appreciated that the improved car possesses a capacity as great as that of the ordinary freight-car and that it may be built almost if not quite as cheap as the same.

Having thus described my invention, what I claim is—

1. In a freight-car, the combination with a bottom wall, a false bottom wall provided with openings and arranged above the bottom wall so as to serve in conjunction with the same to form a chamber, and the side and end walls having recesses $u$ in their inner sides; of imperforate bottom sections removably secured in the recesses of the side walls and adapted when let down to entirely cover the false bottom wall and form an imperforate bottom, substantially as specified.

2. In a freight-car, the combination with a bottom wall, a false bottom wall provided with openings and arranged above the bottom wall so as to serve in conjunction with the same to form a chamber, the side and end walls having recesses $u$, in their inner sides and the beveled sills at the base of the recesses $u$; of imperforate bottom sections removably secured in the recesses $u$, and having beveled edges engaging the beveled sills and adapted when let down to entirely cover the false bottom wall and form an imperforate bottom, and turning-buttons removably securing said sections in the recesses $u$, substantially as specified.

3. In a freight-car, the combination of the two bottom walls forming a chamber between them, the side walls, the end walls having openings coincident with and communicating directly with the chamber between the bottom walls, the vertical guides connected to the outer end walls at opposite sides of the openings therein, the plug-doors pivotally connected at their upper edges to rods mounted in bearings on the outer sides of said guides and adapted to close the openings in the end walls, and vertically-slidable doors arranged in the guides and having openings therein; the said slidable doors being adapted to rest over the openings in the end walls when the plug-doors are opened and being also adapted, in such position, to hold the plug-doors open, substantially as specified.

4. In a freight-car, the combination of the bottom wall and the false bottom wall having openings and serving in conjunction with the bottom wall to form an ice-chamber, the end walls having openings coincident with the ice-chamber for charging the same with ice, and suitable doors for closing said openings, substantially as specified.

In testimony whereof I affix my signature in presence of two witnesses.

HENRY F. STANLEY.

Witnesses:
SIDNEY ROBINSON,
SEYMOUR BERNSTEIN.